W. N. MOORE.
EYEGLASSES.
APPLICATION FILED DEC. 23, 1912.
1,252,139. Patented Jan. 1, 1918.
2 SHEETS—SHEET 1.
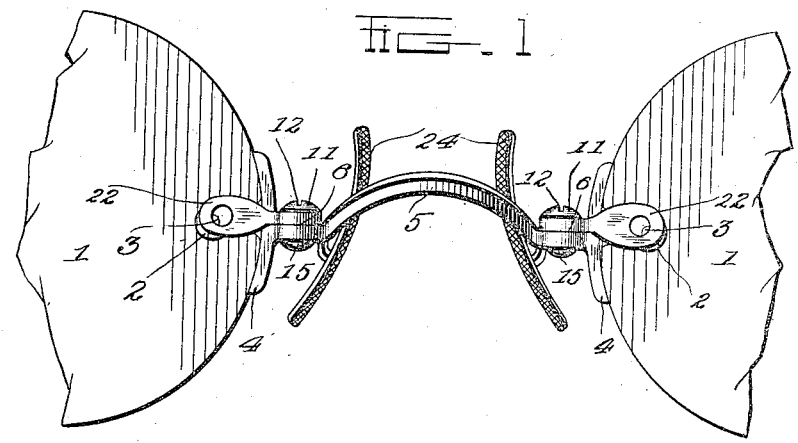
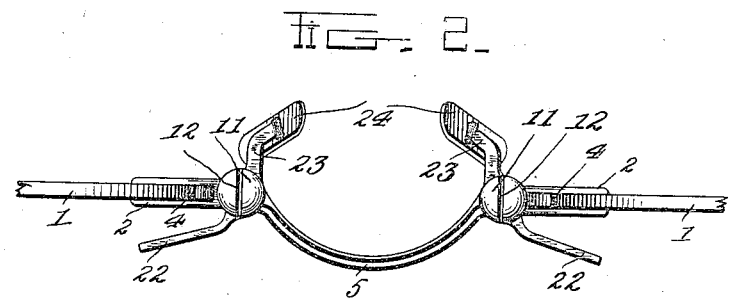
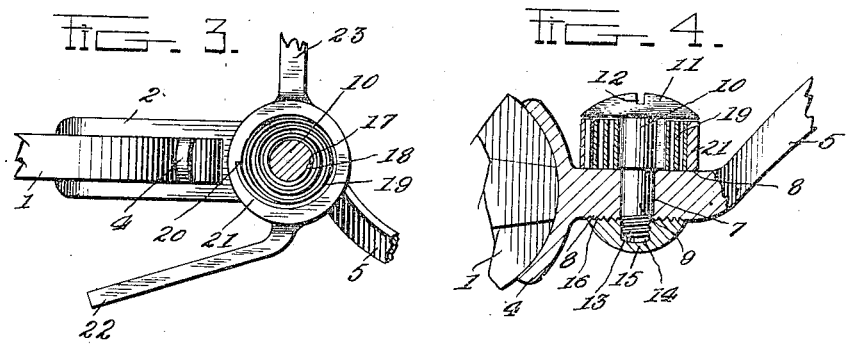
Witnesses
Inventor W. N. MOORE.
EYEGLASSES.
APPLICATION FILED DEC. 23, 1912.
1,252,139.
Patented Jan. 1, 1918.
2 SHEETS—SHEET 2.
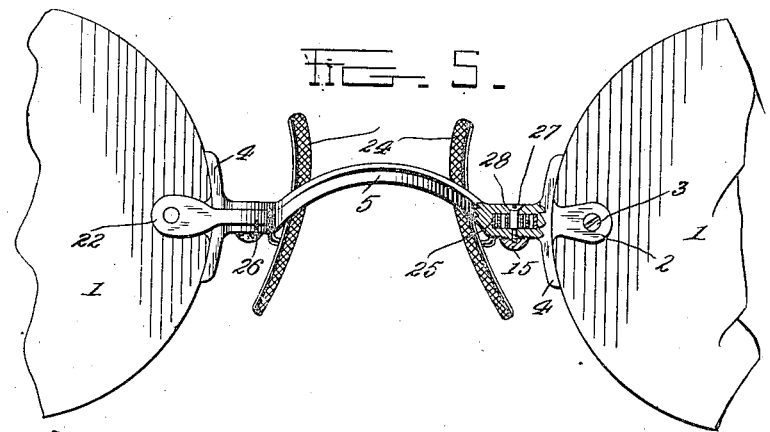
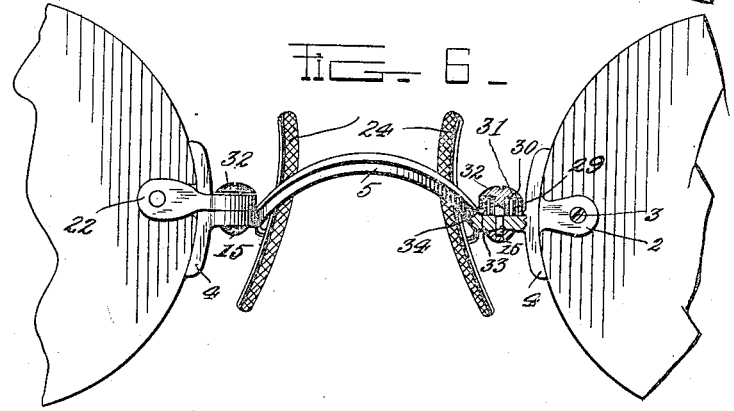
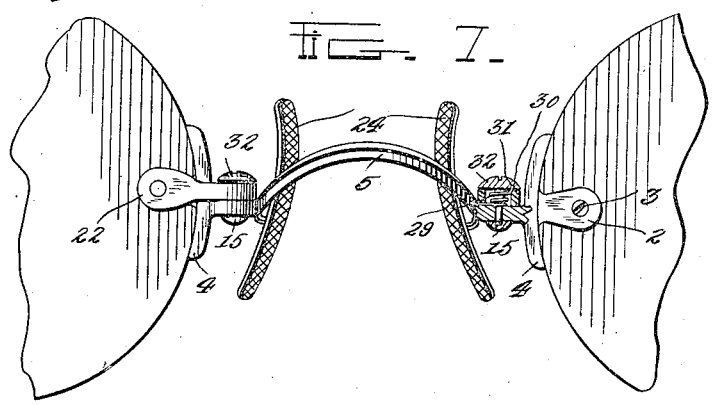
Witnesses
Inventor

UNITED STATES PATENT OFFICE.

WILLIAM N. MOORE, OF WASHINGTON, DISTRICT OF COLUMBIA, ASSIGNOR TO AMERICAN OPTICAL COMPANY, OF SOUTHBRIDGE, MASSACHUSETTS, A VOLUNTARY ASSOCIATION OF MASSACHUSETTS.

EYEGLASSES.

1,252,139.    Specification of Letters Patent.    Patented Jan. 1, 1918.

Application filed December 23, 1912. Serial No. 738,219.

*To all whom it may concern:*

Be it known that I, WILLIAM N. MOORE, a citizen of the United States, residing at Washington, in the District of Columbia, have invented certain new and useful Improvements in Eyeglasses, of which the following is a specification.

My invention relates to improvements in eyeglasses, and refers particularly to what are known as finger lever eyeglasses, or more plainly speaking to eyeglasses in which spring actuated levers carry the gripping means and are operated by the fingers.

One object of my invention is the provision of an eyeglass in which the operating springs are entirely concealed from view and are protected from contact or interference as well as from the entrance of dust or dirt to the springs.

Another object of my invention is the provision of an eyeglass which will permit of the instant adjustment of the tension of the springs to accommodate the requirements of the user without removing the springs, but which will permit of the removal of the springs with ease when found necessary.

Another object of my invention is the provision of an eyeglass in which the springs are entirely concealed and protected, which permits of instant adjustment or application and removal of the springs, and which renders the general exterior appearance of the mounting small and compact and highly ornamental and attractive.

Another object of my invention is the provision of an eyeglass in which either flat or round springs may be used, and which will be of the most simple, durable and inexpensive construction, in order that from every point of view the improvement will be thoroughly efficient and practical.

With these objects in view my invention consists of an eyeglass mounting embodying novel features of construction and combination of parts substantially as shown and described, and particularly defined by the claims.

In order that the detailed construction and the operation of my mounting may be fully understood and the advantages which accrue from my improvement be fully appreciated, I have illustrated in the accompanying drawings a number of constructions of eyeglass mountings embodying my invention, it being understood that I reserve the right to make any changes or modifications in my invention which fall within the scope of the claims.

Figure 1 represents a front elevation of an eyeglass mounting constructed in accordance with my invention, a sufficient portion of the lenses being illustrated, and the drawings for the purpose of clearness, being on an enlarged scale.

Fig. 2 represents a top plan view of the improvement.

Fig. 3 represents a top plan view on an enlarged scale of one-half of the mounting, the post or stud being shown in section and the spring being illustrated in the position it occupies with reference to the post and lever, and Fig. 4 represents a vertical sectional view of one-half or section of the mounting, with the post or support in elevation and the spring in section.

Fig. 5 represents a front elevation of a modified construction of my eyeglass mounting, one section of the mounting being in section for the purpose of illustration and clearness.

Fig. 6 represents a similar view of another form or modification of my invention, and Fig. 7 represents another form or modification of an eyeglass mounting constructed in accordance and embodying my invention.

Referring by numeral to the drawings, in which similar characters of reference are employed to denote corresponding parts in all of the views of the drawings.

The numeral 1 designates the pair of lenses, 2 the pair of clips or ears secured by screws 3, through the lenses, 4 the straps fitting against the inner curved edges of the lenses, and 5 the bow or bridge connection, all of which parts are preferably made from a single piece of stock or blank.

The bow or bridge connection has certain peculiarities or novel features of construction, being provided adjacent the straps with the horizontal tables or platforms 6, provided with an opening 7, and upon its under face with teeth or serrations 8, the opening receiving the reduced stem 9, of the post or support 10, having the large head 11 provided with a slot 12, to receive a suitable implement, and the reduced stem of the posts or supports is provided at its lower end with screw threads 13, with which engage the threads 14, formed in the cap or head 15, which caps are provided with teeth or serrations 16, whose function is to engage the teeth or serrations 8, and retain the posts or supports at the desired adjustment.

From this construction it will be observed that the bow or bridge connection is provided with a pair of platforms or tables, in which is mounted the pair of posts or supports, and also that the posts or supports are capable of being turned or rotated and retained in various adjusted positions by means of the adjusting heads attached, and in the form of my invention shown in Figs. 1, 2, 3 and 4, the posts or supports are each provided with a recess providing stops or abutments 17, which receive one end 18, of the springs 19, the other or outer end of the springs bearing against the stops or abutments 20, formed in the inclosing case 21, forming a part of the levers, said levers each having the finger grasping portion 22, and the arm 23, which carries the nose pads or grips 24.

From this construction it will be observed that the bridge connection is formed with a pair of horizontally disposed circular tables or platforms upon which is mounted the pair of adjustable posts or supports, and that between the enlarged heads of the posts or supports and the tables are disposed the circular rings or cases formed on the operating levers, and that within the space between the cases of the levers and the posts is concealed and protected the springs, which exert their tension upon the posts and lever cases to operate the levers and cause the nose pads or grips to properly engage the nose, and also that the tension of the springs can be instantly adjusted by removing the adjusting caps, turning the posts or supports and when the springs have been given the proper tension, the adjusting caps are brought into engagement with the tables or platforms and retain the springs at their proper and desired adjustment. If found necessary to remove a spring the post or support is detached, the spring is inserted in the case of the lever and the parts assume normal position.

The form of my invention shown in Fig. 5 differs only from the other construction in forming the bow or bridge with central openings 25, in which fit the open rings or cases 26, of the finger levers, and the heads 27, of the posts or supports fit in recesses or countersunk openings 28, this form giving a compact and highly ornamental appearance to the mounting and the spring and cases being entirely concealed within the openings formed in the tables or platforms of the bow or bridge connection.

In the construction shown in Fig. 6, the springs 29, have at one end a lug 30, which engages a socket 31, in the heads 32, of the posts or supports, and the other ends of the springs are formed with lugs 33, which engage recesses 34 in the cases of the levers.

In the form of my invention shown in Fig. 7, the construction is practically similar to that illustrated in Fig. 6, except that coiled springs 35, of round form are used, either construction of springs answering the purpose and operating in exactly the same manner.

From the foregoing description taken in connection with the drawings the advantages of my invention will be readily understood and appreciated by all persons skilled in the art, and it will be instantly apparent that the features of simplicity, durability and inexpensiveness have been preserved; that easy adjustment of the tension of the springs is possible, or removal and application of the springs entirely is provided for, and that the general appearance of the mounting is small and free from bunches or enlargement and is of a highly ornamental and attractive exterior, thus combining every requisite demanded in an eyeglass mounting.

The most important feature of my invention resides in the seating or depressing of the actuating springs in the body portion of the levers, which does away entirely with boxes mounted on the levers and gives a neat appearance to the mounting and saves in expense of manufacture.

I claim:

1. In an eyeglass, the combination with the lenses, the bridge connection formed with a pair of platforms, supports mounted in said platforms and adjustable therein, levers having cases surrounding said supports, and operating springs inclosed in said cases and engaging supports and levers.

2. In an eyeglass, the combination with the lenses, the bridge connections formed with a pair of tables or platforms, adjustable posts or supports mounted in said platforms, and formed with an enlarged head, levers having cases surrounding said supports and covered by the head thereof, and springs arranged in said cases and engaging the levers and supports.

3. In an eyeglass, the combination with the lenses, the bridge connection, the supports mounted in the bridge connection, and formed with a stop or abutment, the levers having cases surrounding said supports and formed with a stop or abutment, and springs disposed in the cases of the levers in the same plane with said levers and having one end engaging the abutments of the levers and the other end engaging the abutment of the supports.

4. In an eyeglass, the combination with the lenses, the bridge connection, the supports mounted in the bridge connection and formed with a stop or abutment, the levers having cases surrounding said supports and formed with a stop or abutment, and springs disposed in the cases of the levers and having one end engaging the abutments of the levers and the other end engaging the abutment of the supports, and means for adjusting the supports to regulate the tension of the springs.

5. In an eyeglass, the combination with the lenses, bridge connection, and levers provided with spring receiving cases, of posts or supports mounted in the bridge connection and formed with enlarged heads to entirely cover the spring receiving cases of the levers, and actuating springs arranged in said cases and having engagement with said cases and supports, said levers being in the same plane as the body of the actuating springs.

6. In an eyeglass, the combination with the lenses, bridge connection, and levers provided with spring receiving cases, of posts or supports mounted in the bridge connection and formed with enlarged heads to entirely cover the spring receiving cases of the levers, and actuating springs arranged in said cases and having engagement with said cases and supports, and means for adjusting the tension of the springs.

7. In an eyeglass, the combination with the lenses, bridge connection, and levers provided with spring receiving cases, of posts or supports mounted in the bridge connection and formed with enlarged heads to entirely cover the spring receiving cases of the levers, and actuating springs arranged in said cases and having engagement with said cases and supports, and means having clamping engagement with the supports and bridge connection for adjusting the tension of the springs.

8. In an eyeglass, the combination with the lenses, bridge connection, and levers provided with spring receiving cases, of posts or supports mounted in the bridge connection and formed with enlarged heads to entirely cover the spring receiving cases of the levers, and actuating springs arranged in said cases and having engagement with the supports and cases, and adjusting caps or nuts mounted on the supports and engaging the bridge connection for adjusting the tension of the springs.

9. In an eyeglass, the combination with the lenses, bridge connection and levers, of supports mounted in the bridge connection and retaining the levers in position, means for adjusting the axial position of the supports, and springs mounted in the levers and having their ends engaging the levers and supports for actuating said levers.

10. In an eyeglass, the combination with the lenses, bridge connection, and levers carrying nose grips, of supports mounted in openings formed in the bridge connection and having a threaded stem, springs mounted in the levers and engaging the supports and levers said bridge connection being formed with teeth, adjusting nuts mounted on the threaded stems of the supports, and having teeth to engage the teeth of the bridge connection for adjusting said supports.

11. In an eyeglass, the combination with the lenses, the bridge connection provided with teeth, the supports mounted on the bridge connection and having at one end a head or enlargement and at the other end a threaded stem, adjusting caps engaging said threaded stems and formed with teeth to engage the teeth of the bridge connection, levers having open cases surrounding said supports, and springs having engagement with the supports and cases for actuating the levers.

12. In an eyeglass, the combination with the lenses, the bridge connection and the levers carrying the nose grips, of posts mounted in the bridge connection, operating springs coiled about the posts, said levers having openings in their body portions extending entirely therethrough and providing cases for receiving and for concealing the springs, means on the posts to cover the springs and coöperating with the levers to prevent wabbling and means for adjusting the tension of said springs.

13. In an eyeglass, the combination of the lenses, bridge connection and operating levers having openings in their body portions extending entirely therethrough, posts disposed in said openings to leave a space, and springs arranged in said spaces in the same plane as the body of the levers having one end engaging the levers and the other end engaging said posts.

14. In an eyeglass, the combination of the lenses, bridge connection and operating levers having openings in their body portions extending entirely therethrough, posts disposed in said openings to leave a space, and springs arranged in said spaces in the same plane as the body of the levers having one end engaging the levers and the other end engaging said posts, and means for adjusting said springs.

In testimony whereof I affix my signature in presence of two witnesses.

WILLIAM N. MOORE.

Witnesses:
A. M. PARKINS,
W. W. WRIGHT.

Copies of this patent may be obtained for five cents each, by addressing the "Commissioner of Patents, Washington, D. C."